(12) United States Patent
Franks et al.

(10) Patent No.: US 10,830,523 B2
(45) Date of Patent: Nov. 10, 2020

(54) REFRIGERATOR APPLIANCE AND METHOD OF SABBATH OPERATION

(71) Applicant: Haier US Appliance Solutions, Inc., Wilmington, DE (US)

(72) Inventors: Darin Franks, Lanesville, IN (US); Robert Marten Bultman, Louisville, KY (US); Samuel Vincent DuPlessis, Louisville, KY (US); William Thea, Upper Saddle River, NJ (US); Rabbi Tsvi Ortner, Brooklyn, NY (US); Eliyahu Antebi, Lakewood, NJ (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 19 days.

(21) Appl. No.: 15/604,752

(22) Filed: May 25, 2017

(65) Prior Publication Data

US 2018/0340720 A1 Nov. 29, 2018

(51) Int. Cl.
*F25D 21/08* (2006.01)
*F25B 49/02* (2006.01)
*F25D 29/00* (2006.01)

(52) U.S. Cl.
CPC .............. *F25D 21/08* (2013.01); *F25B 49/02* (2013.01); *F25D 29/00* (2013.01); *F25B 2600/01* (2013.01); *F25B 2600/02* (2013.01); *F25B 2600/0251* (2013.01); *F25B 2600/23* (2013.01); *F25B 2700/2104* (2013.01); *F25D 2323/021* (2013.01)

(58) Field of Classification Search
CPC ............. F25D 2600/02; F25D 2700/12; F25D 2700/14; F25D 21/08; F25B 49/022; F25B 2600/01; F25B 2600/02; F25B 2600/0251; F25B 49/02
See application file for complete search history.

(56) References Cited

U.S. PATENT DOCUMENTS 4,345,162 A * 8/1982 Hammer ............ G05D 23/1913
307/35
4,694,890 A * 9/1987 Zarate ................... F25B 49/022
165/256

(Continued)

FOREIGN PATENT DOCUMENTS

CN 201589491 U * 9/2010 ............. F25D 29/00
CN 203893570 U 10/2014

(Continued)

OTHER PUBLICATIONS

English Translation of CN201589491U.*

*Primary Examiner* — Marc E Norman
*Assistant Examiner* — Schyler S Sanks
(74) *Attorney, Agent, or Firm* — Dority & Manning, P.A.

(57) ABSTRACT

A refrigerator appliance and method of operation during Jewish holidays is provided herein. The refrigerator appliance may include a cabinet defining a refrigerated chamber, a sealed cooling system, and a controller. The sealed cooling system may be in operable communication with the refrigerated chamber and include a compressor. The controller may be operatively coupled to the sealed cooling system. The controller may be configured to selectively control the refrigerator appliance according to an operation routine for a Jewish holiday.

14 Claims, 5 Drawing Sheets

(56) References Cited

U.S. PATENT DOCUMENTS

| | | | | |
|---|---|---|---|---|
| 5,808,278 | A | * | 9/1998 | Moon .................... A47G 33/00 |
| | | | | 200/43.01 |
| 5,934,088 | A | * | 8/1999 | Takeda .................. F25B 49/005 |
| | | | | 62/127 |
| 6,070,110 | A | * | 5/2000 | Shah .................... F24F 11/0008 |
| | | | | 165/205 |
| 6,703,591 | B2 | | 3/2004 | Daum et al. |
| 6,990,820 | B2 | * | 1/2006 | Park ....................... F25D 29/00 |
| | | | | 236/91 A |
| 2012/0047921 | A1 | * | 3/2012 | Besore ................... F25D 21/06 |
| | | | | 62/80 |
| 2014/0327501 | A1 | | 11/2014 | Cohen |
| 2016/0170392 | A1 | | 6/2016 | Cohen |
| 2017/0097187 | A1 | * | 4/2017 | Thea .................... F25D 27/005 |

FOREIGN PATENT DOCUMENTS

| | | | |
|---|---|---|---|
| KR | 1019940003351 | * | 2/1994 |
| WO | WO2011072515 A1 | | 6/2011 |

* cited by examiner

REFRIGERATOR APPLIANCE AND METHOD OF SABBATH OPERATION

FIELD OF THE INVENTION

The present subject matter relates generally to refrigerator appliances, and more particularly to methods of operating refrigerator appliances during Sabbath.

BACKGROUND OF THE INVENTION

Generally, Orthodox Jewish customs require that certain traditions be maintained during designated times. For instance, the Sabbath or Shabbat is set aside as a time when no work should be performed. This prohibition on work may apply not only to an observer's direct physical actions, but also to actions initiated through the observer's appliances. For instance, a user may be required to abstain from causing an appliance to change its normal pattern of operation. In other words, the user may be prohibited from actions that would result in a direct response from the appliance, such as activating a light or sub-system. However, many appliances are configured to provide this kind of direct response. In the field of refrigerator appliances, opening of a door may cause an internal light to illuminate. In some refrigerator appliances, a cooling cycle of the refrigerator appliance may be altered in response to the door being opened. Unfortunately, these actions may violate the sanctity of the day.

In order to properly observe Orthodox Jewish customs, some appliances provide a method of manually disabling certain functions. For instance, one or more inputs may be configured to disable electrical displays and/or lights within the refrigerator appliance. However, a user must remember to manually program these inputs such that the displays and/or lights are maintained in an active (e.g., illuminated) or inactive (e.g., unilluminated) state. Similarly, a cooling system for the refrigerator appliance may be manually set to a rigid (i.e., unaffected by a user's actions) cooling cycle during the Sabbath. These appliances create certain difficulties or undesirable conditions. As an example, a user must remember to change the program or input once the Sabbath has ended. Failure to do so may cause the appliance to operate in an inefficient or undesired manner. In the case of a cooling cycle, there is a risk that food may spoil or freeze if a rigid cooling cycle is maintained for too long.

Accordingly, it may be useful to provide a method and/or refrigerator appliance that can automatically adhere to Orthodox Jewish traditions, especially during the Sabbath.

BRIEF DESCRIPTION OF THE INVENTION

Aspects and advantages of the invention will be set forth in part in the following description, or may be obvious from the description, or may be learned through practice of the invention.

In one aspect of the present disclosure, a method of operating a refrigerator appliance is provided. The method may include determining a Sabbath condition automatically according to a preset geographic location for the refrigerator appliance. The method may also include instituting a Sabbath mode of the refrigerator appliance in response to determining the Sabbath condition. The may further include initiating a cooling cycle of the compressor along a set compressor interval during the instituted Sabbath mode to compress a sealed refrigerant for the duration of the cooling cycle.

In another aspect of the present disclosure, a refrigerator appliance is provided. The refrigerator appliance may include a cabinet defining a refrigerated chamber, a sealed cooling system, and a controller. The sealed cooling system may be in operable communication with the refrigerated chamber and include a compressor. The controller may be operatively coupled to the sealed cooling system. The controller may be configured to selectively control the refrigerator appliance according to an operation routine. The operation routine may include determining a Sabbath condition automatically according to a preset geographic location for the refrigerator appliance, including determining a Sabbath start time and a Sabbath end time, instituting a Sabbath mode of the refrigerator appliance in response to determining the Sabbath condition upon reaching the Sabbath start time, initiating a cooling cycle of the compressor along a set compressor interval during the instituted Sabbath mode to compress a sealed refrigerant for the duration of the cooling cycle, and instituting a non-Sabbath mode for the refrigerator appliance automatically upon reaching the determined Sabbath end time.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure provides an appliance, such as a refrigerator appliance, and a method of operating the appliance during Sabbath. The appliance may automatically determine when Sabbath occurs based on a specific geographic location. Moreover, the appliance may automatically enter and remain in a Sabbath mode during Sabbath. The Sabbath mode may prevent a user from performing any work without having to mentally consider when the Sabbath begins and/or ends. This may occur while still keeping food within the refrigerator appliance cold or at an otherwise suitable temperature.

Figure 1:
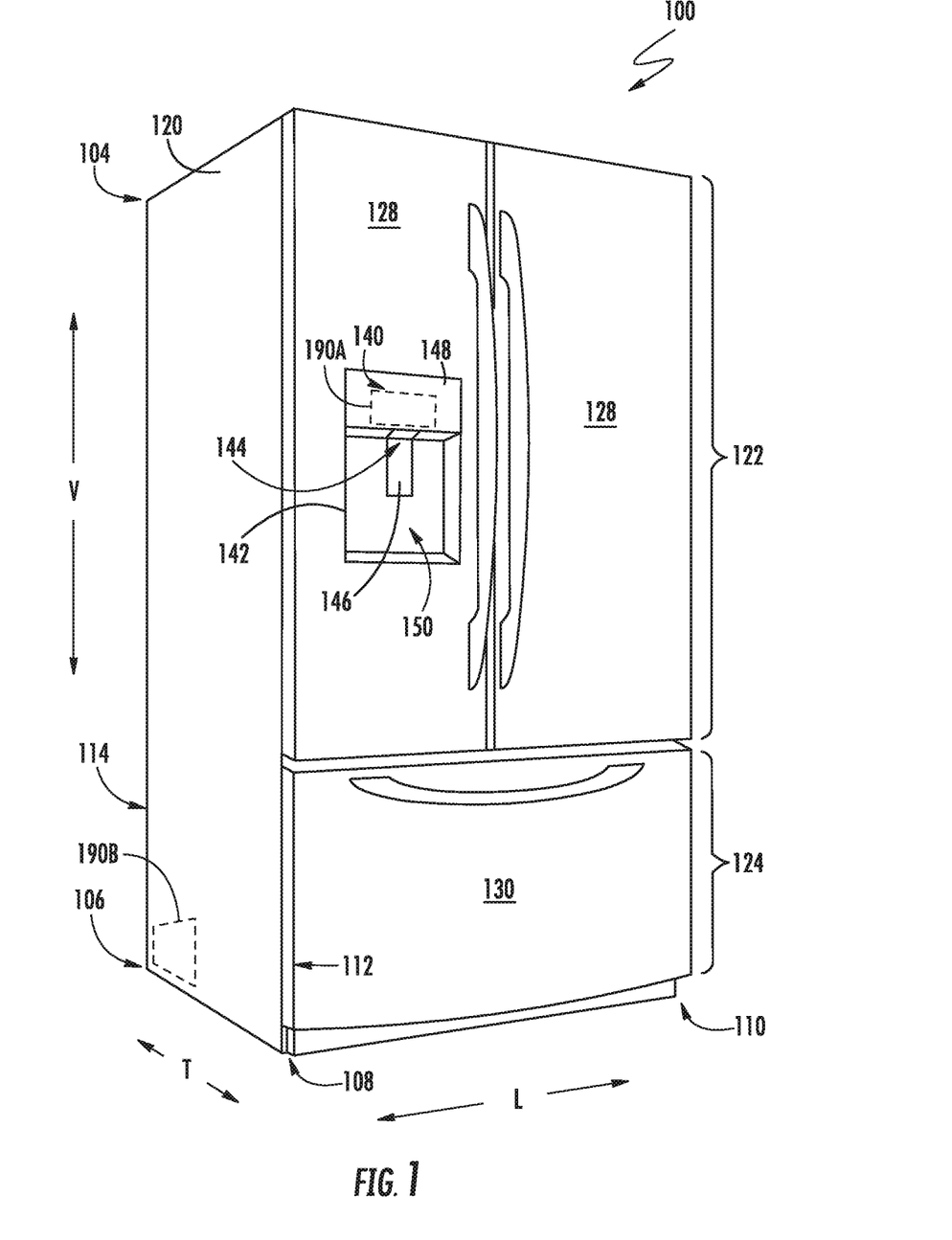
FIG. 1 provides a perspective view of a refrigerator appliance according to example embodiments of the present disclosure.
Figure 2:
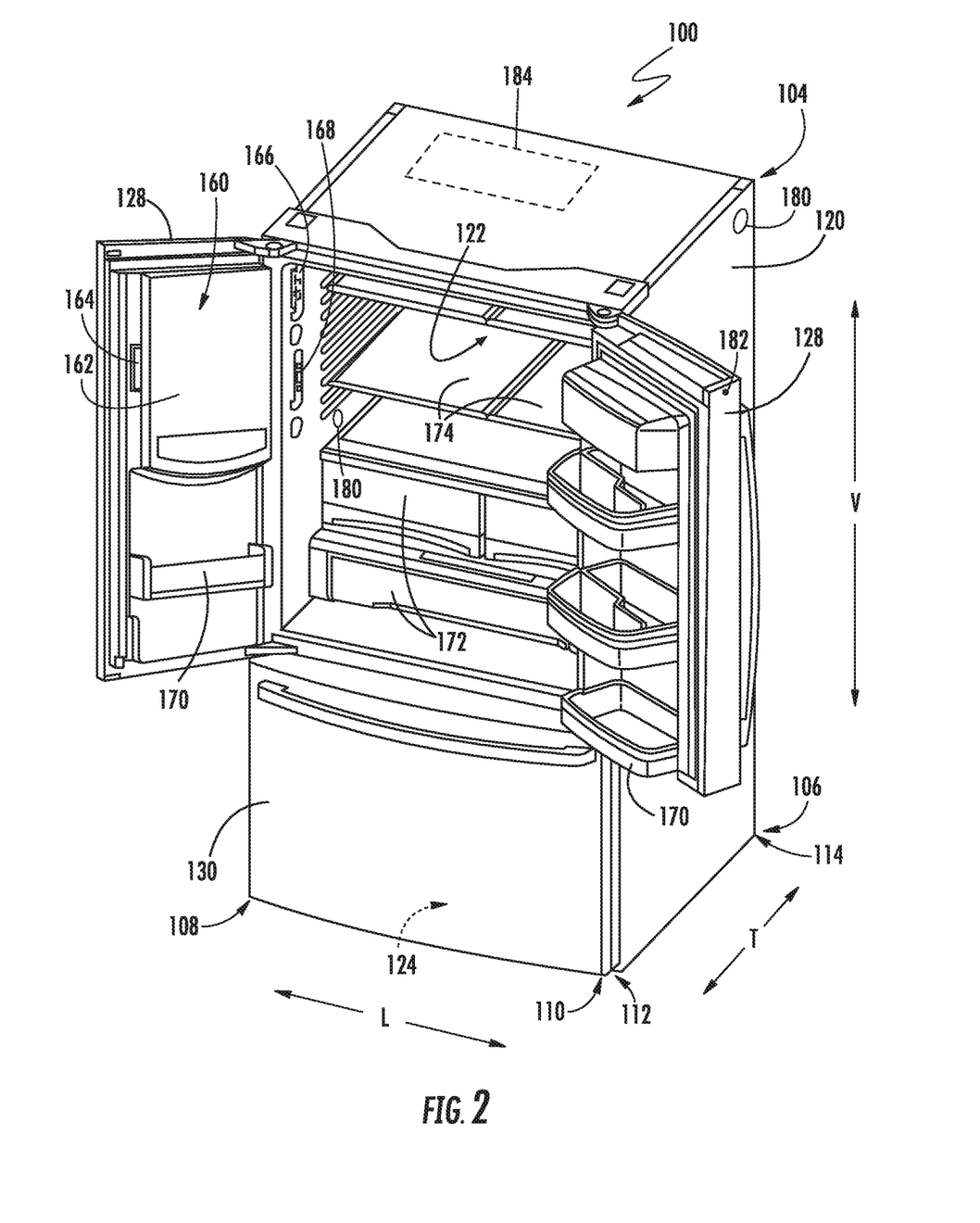
FIG. 2 provides a perspective view of the example refrigerator appliance shown in FIG. 1, wherein a refrigerator door is in an open position according to example embodiments of the present disclosure.

Turning now to the figures, FIG. 1 provides a perspective view of a refrigerator appliance 100 according to an example embodiment of the present disclosure. FIG. 2 provides another perspective view of refrigerator appliance when one or more doors 128, 130 are open. Refrigerator appliance 100 includes a cabinet or housing 120 that extends between a top portion 104 and a bottom portion 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Housing 120 defines chilled chambers for receipt of food items for storage. In particular, housing 120 defines fresh food chamber 122 positioned at or adjacent top portion 104 of housing 120. Refrigerator appliance 100 also includes a freezer chamber 124 that is, for example, arranged at or adjacent bottom portion 106 of housing 120. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance or a side-by-side style refrigerator appliance. Consequently, the description set forth herein is for illustrative purposes only and is not intended to be limiting in any aspect to any particular chilled chamber configuration.

Refrigerator doors 128 are rotatably hinged to an edge of housing 120 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in a closed configuration in FIG. 1.

Refrigerator appliance 100 also includes a dispensing assembly 140 for dispensing liquid water and/or ice. Dispensing assembly 140 includes a dispenser 142 positioned on or mounted to an exterior portion of refrigerator appliance 100, e.g., on one of doors 128. Dispenser 142 includes a discharging outlet 144 for accessing ice and liquid water. An actuating mechanism 146, shown as a paddle, is mounted below discharging outlet 144 for operating dispenser 142. In alternative example embodiments, any suitable actuating mechanism may be used to operate dispenser 142. For example, dispenser 142 can include a sensor (such as an ultrasonic sensor) or a button rather than the paddle. A user interface panel 148 is provided for controlling the mode of operation. For example, user interface panel 148 includes a plurality of user inputs (not labeled), such as a water dispensing button and an ice-dispensing button, for selecting a desired mode of operation such as crushed or non-crushed ice.

Discharging outlet 144 and actuating mechanism 146 are an external part of dispenser 142 and are mounted in a dispenser recess 150. Dispenser recess 150 is positioned at a predetermined elevation convenient for a user to access ice or water and enabling the user to access ice without the need to bend-over and without the need to open doors 128. In example embodiments, dispenser recess 150 is positioned at a level that approximates the chest level of a user.

As shown, for instance in FIG. 2, at least one door 128 may include a door liner 132 defining a sub-compartment, e.g., icebox compartment 160. Icebox compartment 160 extends into fresh food chamber 122 when refrigerator door 128 is in the closed position. Although icebox compartment 160 is shown in door 128, additional or alterative embodiments may include an icebox compartment defined within door 130. As discussed in greater detail below, an ice making assembly or icemaker (not pictured) may be positioned or disposed within icebox compartment 160. Thus, ice may be supplied to dispenser recess 150 (see FIG. 1) from the icemaker 210 and/or ice dispenser unit 220 in icebox compartment 160 on a back side of refrigerator door 128.

An access door—e.g., icebox door 162—may be hinged to icebox compartment 160 to selectively cover or permit access to opening of icebox compartment 160. Icebox door 162 permits selective access to icebox compartment 160. Any manner of suitable latch 164 is provided with icebox compartment 160 to maintain icebox door 162 in a closed position. As an example, latch 164 may be actuated by a consumer in order to open icebox door 162 for providing access into icebox compartment 160. Icebox door 162 can also assist with insulating icebox compartment 160, e.g., by thermally isolating or insulating icebox compartment 160 from fresh food chamber 122. This thermal insulation helps maintain icebox compartment 160 at a temperature below the freezing point of water. In addition icebox compartment 160 may receive cooling air from a chilled air supply duct 166 and a chilled air return duct 168 disposed on a side portion of housing 120 of refrigerator appliance 100. In this manner, the supply duct 166 and return duct 168 may recirculate chilled air from a suitable sealed cooling system 200 (see FIG. 3) through icebox compartment 160.

Figure 3:
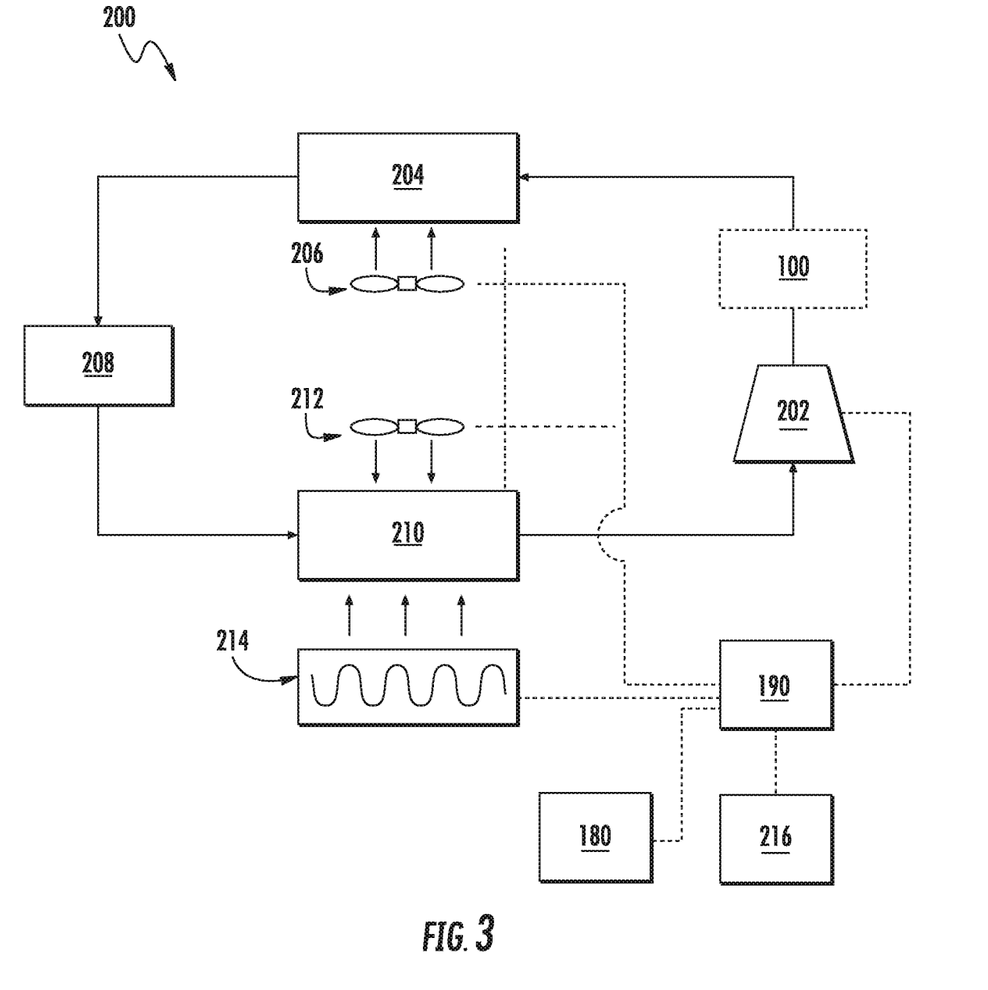
FIG. 3 provides a schematic view of various components of the example embodiments of FIG. 1.

Operation of the refrigerator appliance 100 can be generally controlled or regulated by a controller 190 (see FIG. 3; see also 190A and 190B). As will be described in greater detail below, controller 190 may include multiple modes of operation (e.g., a Sabbath mode and a non-Sabbath mode) that control or regulate various portions of refrigerator appliance 100 according to one or more discrete criteria. In other words, controller 190 may be configured to control refrigerator appliance 100 differently in a non-Sabbath mode than in a Sabbath mode.

In some embodiments, controller 190 is operatively coupled to user interface panel 148 and/or various other components, as will be described below. User interface panel 148 provides selections for user manipulation of the operation of refrigerator appliance 100 (e.g., during a non-Sabbath mode of operation). As an example, user interface panel 148 may provide for selections between whole or crushed ice, chilled water, and/or specific modes of operation. In response to one or more input signals (e.g., from user manipulation of user interface panel 148 and/or one or more received sensor signals), controller 190 may operate various components of the refrigerator appliance 100 according to the current mode of operation.

Controller 190 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In some embodiments, the processor executes programming instructions stored in memory. For certain embodiments, the instructions include a software package configured to operate appliance 100 and, e.g., execute an operation routine including the example methods 400 and 500 described below with reference to FIGS. 4 and 5. The memory may be a separate component from the processor or may be included onboard within the processor. Alternatively, controller 190 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 190, or portions thereof, may be positioned in a variety of locations throughout refrigerator appliance 100. In example embodiments, controller 190 is located within the user interface panel 148. In other embodiments, the controller 190 may be positioned at any suitable location within refrigerator appliance 100, such as for example within a fresh food chamber, a freezer door, etc. In additional or alternative embodiments, controller 190 is formed from multiple controllers or controller components mounted at discrete locations within or on refrigerator appliance 100. For instance, as illustrated in FIG. 1, a primary controller 190A may be mounted at one location (e.g., within the user interface panel 148) while a secondary controller 190B may be mounted at another location (e.g., within cabinet 120). Input/output ("I/O") signals may be routed between controller 190 and various operational components of refrigerator appliance 100. For example, user interface panel 148 may be operatively coupled to controller 190 via one or more signal lines or shared communication busses.

In some embodiments, one or more temperature sensors 180 are included with refrigerator appliance 100. As an example, a temperature sensor 180 may be in operable communication with a refrigerated chamber 122 or 124 of the refrigerator appliance 100. One or more temperature sensors 180 may be mounted to a liner 132 within cabinet 120. During operations, temperature sensor 180 may thus detect the temperature within refrigerated chamber 122 or 124. As another example, a temperature sensor 180 may be mounted in operable communication with the ambient environment (i.e., the area outside of refrigerator appliance 100). One or more temperature sensors 180 may be mounted to an outer portion of cabinet 120. During operations, temperature sensor 180 may thus detect the ambient temperature for the area surrounding cabinet 120.

Temperature sensor 180 may be any suitable temperature sensor operatively coupled to controller 190. For example, temperature sensor 180 may be a thermistor, a thermocouple, a resistance thermometer, etc. During certain operations, measurements from temperature sensor 180 may be utilized to initiate and/or terminate one or more cycles of sealed cooling system 200, as will be described in detail below.

In additional or alternative embodiments, a door switch 182 is provided in operable communication with one or more corresponding doors 128, 130 of refrigerator appliance 100. In certain modes of operation (e.g., during a non-Sabbath mode of operation), an internal light 184 within refrigerator appliance 100 may be illuminated or dimmed based on whether the corresponding door (e.g., one of doors 128) is detected as being opened (see FIG. 2) or closed (see FIG. 1). Door switch 182 may be positioned at any suitable location to detect the opening/closing of the corresponding door 128 (e.g., along a door 128). Although illustrated as a mechanical plunger switch, door switch 182 may be any suitable position sensor configured to detect the closed and/or open location(s) of a corresponding door 128.

In some embodiments, controller 190 is operatively coupled to the various components of dispensing assembly 140 and may control operation of the various components. For example, the various valves, switches, etc. may be actuatable based on commands from the controller 190 (e.g., during a non-Sabbath mode of operation). As discussed, interface panel 148 may additionally be operatively coupled to the controller 190. Thus, the various operations may occur based on user input or automatically through controller 190 instruction.

Referring now to FIG. 3, refrigerator appliance 100 may include a sealed refrigeration or cooling system 200. In general, sealed cooling system 200 is charged with a refrigerant that is flowed through various components and facilitates cooling of the fresh food compartment 122 and the freezer compartment 124. Sealed cooling system 200 may be charged or filled with any suitable refrigerant, such as R441A, R600a, R600, R290, etc.

Sealed cooling system 200 includes a compressor 202 for compressing the refrigerant, thus raising the temperature and pressure of the refrigerant. Compressor 202 may for example be a variable speed compressor 202, such that the speed of the compressor 202 can be varied between zero (0) and one hundred (100) percent by controller 190. Sealed cooling system 200 may further include a condenser 204, which may be disposed downstream of compressor 202, e.g., in the direction of flow of the refrigerant. Thus, condenser 204 may receive refrigerant from the compressor 202, and may condense the refrigerant by lowering the temperature of the refrigerant flowing therethrough due to, e.g., heat exchange with ambient air. A condenser fan 206 may be used to force air over condenser 204 as illustrated to facilitate heat exchange between the refrigerant and the surrounding air. Condenser fan 206 can be a variable speed fan—meaning the speed of condenser fan 206 may be controlled or set anywhere between and including, e.g., zero (0) and one hundred (100) percent. The speed of condenser fan 206 can be determined by, and communicated to, fan 206 by controller 190, e.g., in certain modes of operation.

Sealed cooling system 200 further includes an evaporator 210 disposed downstream of the condenser 204. Additionally, an expansion device 208 may be utilized to expand the refrigerant, thus further reduce the pressure of the refrigerant, leaving condenser 204 before being flowed to evaporator 210. Evaporator 210 generally is a heat exchanger that transfers heat from air passing over the evaporator 210 to refrigerant flowing through evaporator 210, thereby cooling the air and causing the refrigerant to vaporize. An evaporator fan 212 may be used to force air over evaporator 210 as illustrated. As such, cooled air is produced and supplied to refrigerated compartments 122, 124 of refrigerator appliance 100. In certain embodiments, evaporator fan 212 can be a variable speed evaporator fan 212—meaning the speed of fan 212 may be controlled or set anywhere between and including, e.g., zero (0) and one hundred (100) percent. The speed of evaporator fan 212 can be determined by, and communicated to, evaporator fan 212 by controller 190, e.g., in certain modes of operation.

Evaporator 210 may be in communication with fresh food compartment 122 and freezer compartment 124 to provide cooled air to compartments 122, 124. Alternatively, sealed cooling system 200 may include more two or more evaporators 210, such that at least one evaporator 210 provides cooled air to fresh food compartment 122 and at least one evaporator 210 provides cooled air to freezer compartment 124. In other embodiments, evaporator 210 may be in communication with any suitable component of the refrigerator appliance 100. For example, in some embodiments, evaporator 210 may be in communication with the ice maker (e.g., during a non-Sabbath mode of operation), such as with an ice compartment of the ice maker. From evaporator 210, refrigerant may flow back to and through compressor 202, which may be downstream of evaporator 210, thus completing a closed refrigeration loop or cycle.

As shown in FIG. 3, a defrost heater 214 may be utilized to defrost evaporator 210, e.g., to melt ice that accumulates on evaporator 210. Defrost heater 214 may be positioned adjacent or in close proximity (e.g., below) evaporator 210 within fresh food compartment 122 and/or freezer compartment 124. In certain modes of operation, defrost heater 214 may be activated periodically; that is, a period of time $t_{ice}$ elapses between when defrost heater 214 is deactivated and when defrost heater 214 is reactivated to melt a new accumulation of ice on evaporator 210. The period of time $t_{ice}$ may be a preprogrammed period such that time $t_{ice}$ is the same between each period of activation of defrost heater 214 (e.g., during a Sabbath mode of operation), or the period of time may vary (e.g., during a non-Sabbath mode of operation). Additionally or alternatively, in certain modes of operation (e.g., a non-Sabbath mode of operation) defrost heater 214 may be activated based on some other condition, such as the temperature of evaporator 210 or any other appropriate condition.

In some embodiments, a defrost termination thermostat 216 may be used to monitor the temperature of evaporator 210 (e.g., during a non-Sabbath mode of operation) such that defrost heater 214 is deactivated when thermostat 216 measures that the temperature of evaporator 210 is above freezing, i.e., greater than thirty-two degrees Fahrenheit (32° F.). In some embodiments, thermostat 216 may send a signal to controller 190 or other suitable device to deactivate defrost heater 214 when evaporator 210 is above freezing. In other embodiments, defrost termination thermostat 216 may comprise a switch such that defrost heater 214 is switched off when thermostat 216 measures that the temperature of evaporator 210 is above freezing.

As noted above, controller 190 may include multiple unique modes of operation, such as a Sabbath mode and a non-Sabbath mode. Moreover, controller 190 may automatically (e.g., without active user input or engagement) determine when to enter and/or exit each mode of operation. Moreover, controller 190 may automatically initiate a desirable mode (e.g., Sabbath mode) from the determination.

In some embodiments, such as the example embodiments of FIG. 1, controller 190 includes a discrete primary controller 190A and secondary controller 190B operatively coupled to each other. Primary controller 190A may be generally configured to initiate or regulate various features of refrigerator appliance 100 while secondary controller 190B is configured to determine when a Sabbath condition occurs (e.g., when work-prohibiting Sabbath traditions must be followed). In some such embodiments, secondary controller 190B is programmed to include a preset Jewish calendar. During installation, a user may specify the initial time. A clock module (not shown) may be provided within controller 190 to maintain a current date and time once the initial time is specified. During installation, a user may further specify a geographic location (e.g., zip code, city and state, latitude and longitude, etc.) of the refrigerator appliance 100. Additionally or alternatively, the geographic location may be automatically determined [e.g., by a global positioning satellite unit (not pictured) within controller 190]. Once installed, secondary controller 190B may automatically track and determine when a Sabbath condition occurs along the Jewish calendar at the specified geographic location. For instance, secondary controller 190B may compare the current time to the preset Jewish calendar (e.g., continuously or at a predetermined interval). In some such embodiments, secondary controller 190B may include a communications module to receive information (e.g., from a remote server or website) regarding sunrise and sunset for the specified geographic location. Accordingly, secondary controller 190B may transmit a Sabbath condition signal to the primary controller 190A to indicate exactly when the Sabbath begins and/or ends.

In response to the determined Sabbath condition, controller 190 (e.g., primary controller 190A) may institute or enter into a Sabbath mode. The Sabbath mode may generally provide specific instructions or conditions for how various components of refrigerator appliance 100 may operate. For instance, the user interface panel 148 may be deactivated such that it is held in a constant non-responsive state. In turn, attempted user inputs will be ignored in the Sabbath mode. Moreover, the user interface panel 148 may maintain an unlighted or singular display reading (e.g., "SAB") to indicate or confirm the Sabbath mode has been entered. Further, actuating mechanism 146 may be prevented from responsively delivering ice, as it would in a non-Sabbath mode. Additionally or alternatively, door switch 182 may be deactivated during the Sabbath mode such that opening/closing the corresponding door 128 has no effect on the internal light 184. In turn, internal light 184 may be maintained in a constant on or constant off state during the Sabbath mode.

In some embodiments, the Sabbath mode may limit the operation of the sealed cooling system 200, as shown in FIG. 3. For instance, a set cooling cycle may be provided for the compressor 202 in the Sabbath mode. The cooling cycle generally includes a time span (e.g., in minutes) and/or a speed (e.g., as a percent between zero and one hundred percent) at which compressor 202 runs or operates. The compressor 202 may thus operate to compress and/or motivate the sealed refrigerant through the sealed cooling system 200 for the duration of the cooling cycle.

During the Sabbath mode (i.e., while refrigerator appliance 100 remains in the Sabbath mode), the cooling cycle may be repeated. For instance, the cooling cycle may be initiated along a set compressor interval. The set compressor interval may be defined as a repeating increment or unit of time (e.g., minutes) that is greater than the time span of the cooling cycle. Optionally, the set compressor interval may encompass a period wherein the compressor 202 is active (i.e., during the cooling cycle) and a period wherein the compressor 202 is not active. As the set compressor interval repeats, one individual compressor interval may follow another individual compressor interval. At the beginning or end of each individual interval, a new cooling cycle is initiated. In other words, the compressor 202 may be activated at least once at the beginning or end of each set compressor interval. Thus, the compressor interval may define a time pattern that the cooling cycle is repeated along. This pattern of may be repeated as long as refrigerator appliance 100 remains in the Sabbath mode.

The time span of the cooling cycle may be fixed or, alternatively, variable in the Sabbath mode. In embodiments wherein the time span is fixed, the compressor 202 will run or operate for the same amount of time during each new compressor interval. The time span may be predefined before assembly (e.g., according to gathered test data) or may be defined after installation. For instance, controller 190 may be configured to gather information regarding the run time of compressor 202 during non-Sabbath cooling cycles. In other words, controller 190 may detect one or more continuous operational run times of compressor 202 while refrigerator appliance 100 is in a non-Sabbath mode. Specifically, controller 190 may detect and record how long compressor 202 is required to operate before entering the Sabbath mode. In some such embodiments, the time span of the Sabbath mode cooling cycle may be set according to the recorded continuous operational run time(s). As an example, the time span of the cooling cycle in the Sabbath mode may be set as the most recent recorded continuous operational run time that has been detected during a non-Sabbath mode. As another example, the time span of the Sabbath mode cooling cycle may be set as an average of multiple recorded continuous operational run times that have been detected during a non-Sabbath mode.

In embodiments wherein the time span is variable, the run time of the compressor 202 may vary between different compressor intervals. In other words, the compressor 202 may run for a first amount of time during one individual compressor interval, but run for a second (e.g., different) amount of time during another (e.g., subsequent) individual compressor interval. In some such embodiments, the time span of the cooling cycle is at least partially dependent on a detected temperature (e.g., a temperature detected at one or more of the temperature sensors 180). The detected temperature may be compared to a preset baseline temperature. If the detected temperature is greater than the preset baseline temperature, the time span of the cooling cycle may be increased. If the detected temperature is equal to or less than the preset baseline temperature may be left unchanged. In some embodiments, a temperature may be detected or gathered repeatedly. In other words a new detected temperature may be repeatedly compared to the preset baseline temperature. The detection may occur according to a predetermined pattern (e.g., of time). Alternatively, detection may occur according to a randomized time pattern or interval. As a randomized time pattern, the period between successive detections may vary such that occurrence of each detection cannot be predicted in advance. Advantageously, a user's actions are prevented from causing work to be done at the compressor 202 or refrigerator appliance 100.

In certain embodiments, the time span can be incrementally adjusted. Specifically, time may be added to an initial index or increment of time (i.e., a predetermined segment of time—e.g., in minutes) for the time span of the cooling cycle. In other words, an additional index of time is selectively added to an initial index of the time span for the cooling cycle. For instance, if the detected temperature exceeds a preset baseline temperature, an index of time may be added to an initial run time segment (i.e., the initial index or of the time span for the cooling cycle) such that the compressor 202 continues to operate until both the initial run time segment and the added index of time expire. As an example, the time span of the cooling cycle may be indexed based on a detected temperature within the refrigerated chamber 122 or 124. As another example, the time span of the cooling cycle may be indexed based on a detected temperature from the ambient environment. Optionally, multiple indexes of time may be added to a cooling cycle during the course of an individual compressor interval. Additionally or alternatively, multiple indexes are separated by periods of compressor inaction (e.g., during an individual compressor interval).

In some embodiments, the Sabbath mode includes a deactivation period is required for each individual compressor interval. In other words, the controller 190 may require compressor 202 to maintain an inactive (i.e., non-compressing) state for at least a portion of each compressor interval. In turn, the deactivation period may generally define an amount of time during which compressor 202 must remain inactive. The deactivation period may be independent of the received temperature signal. Thus, if the controller 190 determines that the deactivation period has not been met during a current individual compressor interval (e.g., due to continuous operation of the compressor 202), the controller 190 may initiate the deactivation period. Advantageously, the refrigerator appliance 100 may ensure the sealed cooling system 200 does not freeze without requiring work from a user.

Figure 4:
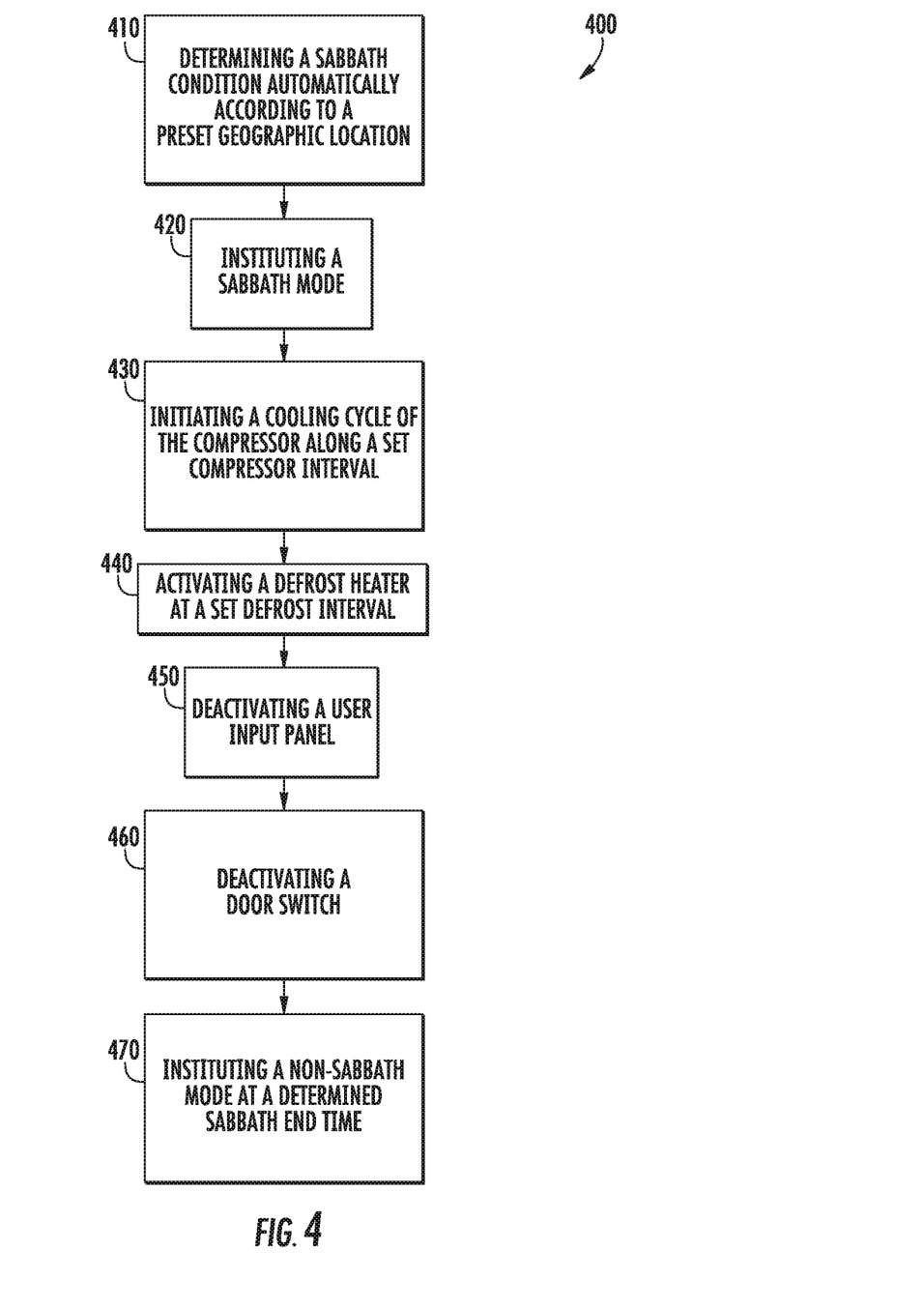
FIG. 4 provides a flow chart illustrating a method of operating a refrigerator appliance in accordance with example embodiments of the present disclosure.
Figure 5:
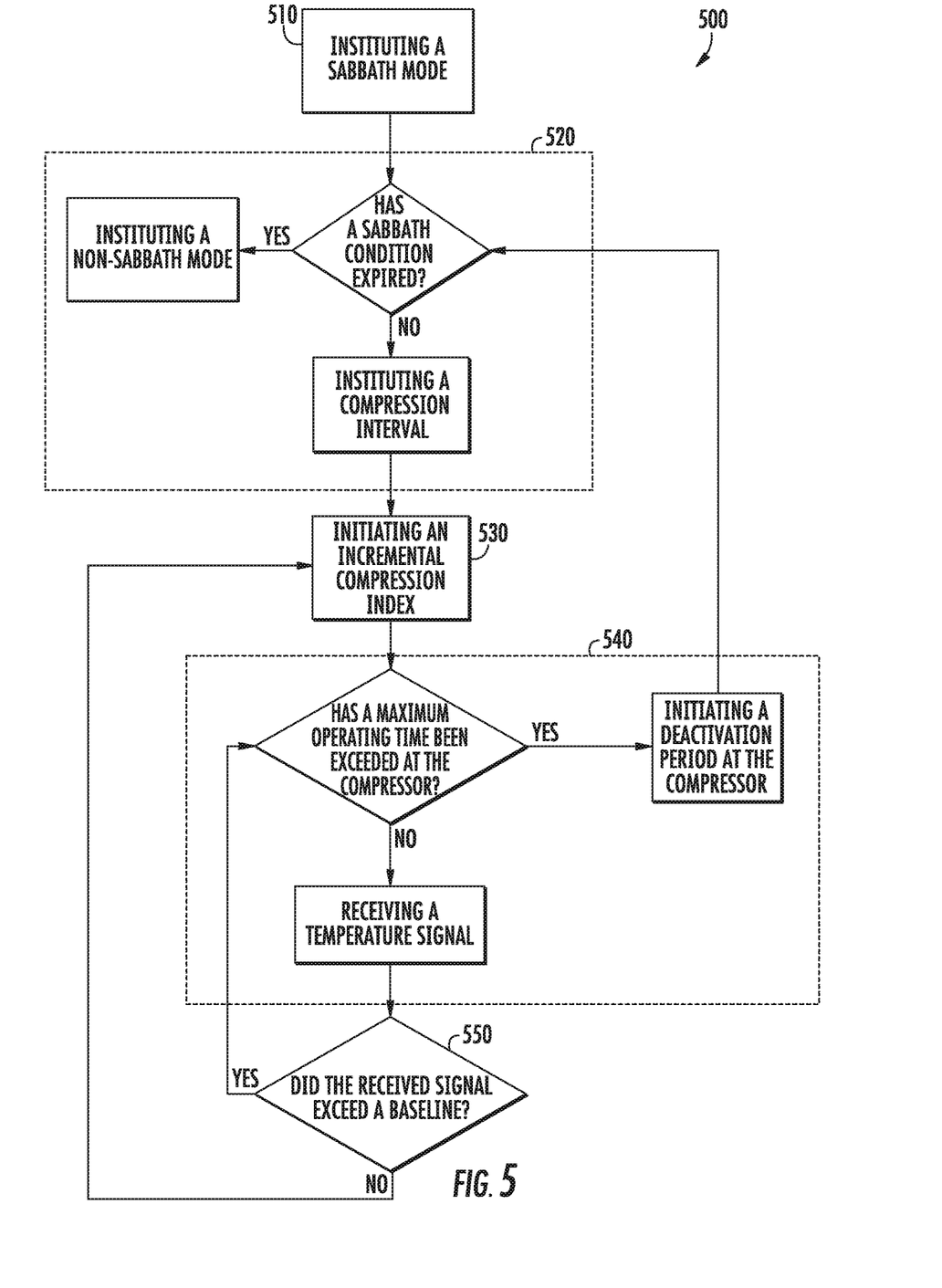
FIG. 5 provides a flow chart illustrating a method of operating a refrigerator appliance in accordance with example embodiments of the present disclosure.

Turning now to FIGS. 4 and 5, flow charts are provided of methods 400 and 500 according to example embodiments of the present disclosure. Generally, the methods 400 and 500 provide for methods of operating a refrigeration appliance 100 (FIG. 1) that includes a cabinet 120, door 128 or 130, and sealed cooling system 200 (FIG. 3), as described above. The methods 400 and 500 can be performed, for instance, by the controller 190 (FIG. 1). For example, controller 190 may, as discussed, be operatively coupled to compressor 202, defrost heater 214, door switch 182, temperature sensor(s) 180, and user interface panel 148. During operations, controller 190 may send signals to and receive signals from compressor 202, defrost heater 214, door switch 182, temperature sensor(s) 180, and control panel 148. Controller 190 may further be operatively coupled to other suitable components of the appliance 100 to facilitate operation of the appliance 100 generally. FIGS. 4 and 5 depict steps performed in a particular order for purpose of illustration and discussion. Those of ordinary skill in the art, using the disclosures provided herein, will understand that the steps of any of the methods disclosed herein can be modified, adapted, rearranged, omitted, or expanded in various ways without deviating from the scope of the present disclosure. For instance, it is understood that method 500 may be used in the context of method 400, or vice versa.

Referring to FIG. 4, at 410, the method 400 includes determining a Sabbath condition automatically according to a preset geographic location for the refrigerator appliance. In some embodiments, the geographic location may correspond to the current physical location of the refrigerator appliance. Moreover, the geographic location may be automatically determined (e.g., by a global positioning satellite unit within the controller) or manually specified by a user (e.g., as a zip code, city and state, latitude and longitude, etc.). Along with the geographic location, it is understood that determining a Sabbath condition includes monitoring the current time (e.g., as maintained at a clock within the controller) and comparing that current time to a programmed Jewish calendar. In turn, 410 may include determining a Sabbath start time and a Sabbath end time. At 410, the method 400 may further include comparing the current time to the determined Sabbath start and end times (e.g., continuously or at a predetermined interval). In some embodiments, 410 determining the Sabbath start time and the Sabbath end time is further based on sun data, such as a sunrise time and a sunset time (e.g., as received from a remote server or website).

At 420, the method 400 includes instituting a Sabbath mode of the refrigerator appliance in response to determining the Sabbath condition at 410. In other words, the refrigerator appliance may transition from a non-Sabbath mode to the Sabbath mode. Operating commands for one or more portions of refrigerator appliance may thus be altered in accordance with the Sabbath mode instructions. The instituted Sabbath mode may continue, for instance, until the Sabbath end time is reached.

At 430, the method 400 includes initiating a cooling cycle of the compressor along a set compressor interval during the instituted Sabbath mode (i.e., the Sabbath mode instituted at 420). In response to the instituted Sabbath mode, the compressor may be activated for one or more cooling cycles during which a sealed refrigerant is compressed. The cooling cycle may be repeated as the set compressor interval repeats. As described above, the set compressor interval may be defined as an increment or unit of time (e.g., minutes) that is greater than the time span of the cooling cycle. The set compressor interval may thus repeat such that a discrete cooling cycle is initiated at the beginning or end of each individual compressor interval.

In some embodiments, 430 includes receiving a temperature signal from a temperature sensor (e.g., mounted within a refrigerated chamber or in communication with the ambient environment). Temperature signals may be received repeatedly at a set interval or, alternatively, at a randomized interval during the Sabbath mode. In certain embodiments, 430 includes adjusting the cooling cycle incrementally based on the received temperature signal, as described above. Moreover, 430 may include comparing a cooling cycle of a corresponding set compressor interval to a maximum run time. If the cooling cycle meets or exceeds the maximum run time, 430 may further include initiating a deactivation period at the corresponding compressor interval.

In additional or alternative embodiments, the method 400 includes detecting a continuous compressor run time corresponding to one or more non-Sabbath cooling cycles. In other words, detecting one or more continuous compressor run times prior to 410. The method 400 may further include determining a Sabbath cooling cycle for the compressor based on the detected continuous compressor run time corresponding to one or more non-Sabbath cooling cycles, wherein the determined Sabbath cooling cycle is the initiated cooling cycle of 430.

At 440, the method 400 includes activating a defrost heater of the sealed cooling system at a set defrost interval during the instituted Sabbath mode. The defrost heater may be mounted, for instance, on an evaporator of the sealed cooling system. In turn, 440 may result in heat being generated at the defrost heater such that accumulated ice or frost may be melted from the evaporator.

At 450, the method 400 includes deactivating the user input panel. As described above, the deactivated user input panel will be generally unresponsive user inputs or commands. Optionally, 450 may include maintaining a display of the user input panel in a constant unlighted state. Alternatively, 450 may include maintaining the display in a constant singular reading (e.g., "SAB").

At 460, the method 400 includes deactivating a door switch. As described above, the deactivated door switch will be generally unresponsive to the movement and position of the doors of the refrigerator appliance. Optionally, 460 may include maintaining an internal light within the cabinet in a constant unlighted state. Alternatively, 460 may include maintaining an internal light within the cabinet in a constant illuminated state.

In some embodiments, it is understood that some or all of 430, 440, 450, and 460 may be performed simultaneously. For instance, each of 430, 440, 450, and 460 may be executed simultaneously upon initiation of the Sabbath mode at 420.

At 470, the method 400 includes instituting a non-Sabbath mode at the determined Sabbath end time. The Sabbath mode may thus be discontinued as the non-Sabbath mode is instituted.

Referring to FIG. 5, at 510, the method 500 includes instituting a Sabbath condition. As described above, the Sabbath mode may be instituted in response to a determined Sabbath condition.

At 520, the method 500 includes evaluating the current state of the refrigerator appliance (e.g., in response to 510). For instance, 520 includes determining if the Sabbath condition has expired. This may include monitoring the current time and comparing that current time to a Sabbath end time. A current time that falls after the Sabbath end time may thus indicate that the Sabbath condition has expired. If the Sabbath condition has expired, 520 may include instituting a non-Sabbath mode, as described above. However, if the Sabbath condition has not expired, 520 may include instituting a new individual compression interval. The compression interval may be defined as a predetermined increment or unit of time that begins to transpire upon the compression interval being instituted, as described above.

At 530, the method 500 includes initiating an incremental compression index in response to the instituted individual compression interval. The compression index may define a time span for which the compressor is commanded to operate. The time span of the cooling cycle will be less than that of the compression interval, such that the cooling cycle occurs during a portion of the compression interval. Thus, the compressor may operate to compress a sealed refrigerant during the course of the incremental compression index.

At 540, the method 500 includes evaluating the operating time of the compressor for the current compression interval. The operating time will generally be tracked as the time for which the compressor is active or being directed to compress the sealed refrigerant. At 540, the method 500 may thus include determining if a maximum operating time has been exceed at the compressor. In other words, the value for the current operating time of the compressor is compared to the value of the maximum operating time. If the maximum operating time has been exceeded, 540 may include initiating a deactivation period at the compressor, as described above, before the method 500 returns to 520. If the maximum operating time has not been exceeded, 540 may include receiving a temperature signal from a temperature sensor (e.g., mounted within a refrigerated chamber or in communication with the ambient environment) before the method proceeds to 550.

At 550, the method 500 includes evaluating the received temperature signal. As described above, the received temperature signal may correspond to a detected temperature. In turn, the received signal or detected temperature may be compared, e.g., to a baseline corresponding to a predetermined baseline temperature. If the received or detected temperature is greater than the baseline, the method 500 may include repeating or returning to 530. In other words, the cooling cycle may be increased or extended by an additional incremental compression index. If the received or detected temperature is equal to or less than the baseline, the method may include repeating or returning to 540, leaving the cooling cycle unchanged.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a refrigerator appliance, the refrigerator appliance comprising a compressor within a sealed cooling system and a temperature sensor mounted to a cabinet of the refrigerator appliance, the method comprising:
  detecting continuous compressor run times corresponding to a plurality of non-Sabbath cooling cycles;
  determining a Sabbath condition automatically according to a preset geographic location for the refrigerator appliance;
  instituting a Sabbath mode of the refrigerator appliance in response to determining the Sabbath condition;
  determining a Sabbath cooling cycle for the compressor as an average of the detected continuous compressor run times corresponding to the plurality of non-Sabbath cooling cycles;
  initiating a cooling cycle of the compressor as the determined Sabbath cooling cycle along a set compressor interval during the instituted Sabbath mode to compress a sealed refrigerant for the duration of the cooling cycle, wherein the set compressor interval encompasses a first predetermined period of time in which the compressor is active and a second predetermined period of time in which the compressor is inactive and power is permitted to the temperature sensor;
  receiving a temperature signal from the temperature sensor during the instituted Sabbath mode irrespective of whether the compressor is inactive; and
  adjusting the cooling cycle based on the received temperature signal, wherein adjusting comprises altering the first predetermined period of time or the second predetermined period of time according to a predetermined increment of time;
  determining the adjusted cooling cycle meets or exceeds a maximum run time; and
  initiating a deactivation period in which the compressor is maintained in an inactive state in response to determining the adjusted cooling cycle meets or exceeds the maximum run time, wherein initiating the deactivation period is independent of the received temperature signal.

2. The method of claim 1, wherein the step of receiving a temperature signal repeats at a randomized interval.

3. The method of claim 1, wherein the temperature sensor is mounted in operable communication with a refrigerated chamber of the refrigerator appliance, and wherein the received temperature signal corresponds to a temperature within the refrigerated chamber during the instituted Sabbath mode irrespective of whether the compressor is inactive.

4. The method of claim 1, wherein the temperature sensor is mounted in operable communication with an ambient environment surrounding the refrigerator appliance, and wherein the received temperature signal corresponds to a temperature of the ambient environment during the instituted Sabbath mode irrespective of whether the compressor is inactive.

5. The method of claim 1, wherein the step of determining a Sabbath condition includes determining a Sabbath end time; the method further comprising instituting a non-Sabbath mode for the refrigerator appliance automatically upon reaching the determined Sabbath end time.

6. The method of claim 1, further comprising activating a defrost heater of the sealed cooling system at a set defrost interval during the instituted Sabbath mode.

7. The method of claim 1, further comprising deactivating a user interface panel in response to the instituted Sabbath mode, the user interface panel being maintained in an unresponsive state continuously during the instituted Sabbath mode.

8. The method of claim 1, further comprising deactivating a door switch in response to the instituted Sabbath mode, the door switch being maintained in an unresponsive state continuously during the instituted Sabbath mode.

9. A refrigerator appliance, comprising:
  a cabinet defining a refrigerated chamber;
  a sealed cooling system in operable communication with the refrigerated chamber, the sealed cooling system comprising a compressor;
  a temperature sensor mounted to the cabinet; and
  a controller operatively coupled to the sealed cooling system and the temperature sensor, the controller being configured to selectively control the refrigerator appliance according to an operation routine comprising
    detecting continuous compressor run times corresponding to a plurality of non-Sabbath cooling cycles,
    determining a Sabbath condition automatically according to a preset geographic location for the refrigerator appliance, including determining a Sabbath start time and a Sabbath end time,
    instituting a Sabbath mode of the refrigerator appliance in response to determining the Sabbath condition upon reaching the Sabbath start time,
    determining a Sabbath cooling cycle for the compressor as an average of the detected continuous compressor run times corresponding to the plurality of non-Sabbath cooling cycles,
    initiating a cooling cycle of the compressor as the determined Sabbath cooling cycle along a set compressor interval during the instituted Sabbath mode to compress a sealed refrigerant for the duration of the cooling cycle,
    receiving a temperature signal from the temperature sensor,
    adjusting the cooling cycle based on the received temperature signal,
    determining the adjusted cooling cycle meets or exceeds a maximum run time,
    initiating a deactivation period during the instituted Sabbath mode in which the compressor is maintained in an inactive state in response to determining the adjusted cooling cycle meets or exceeds the maximum run time, wherein initiating the deactivation period is independent of the received temperature signal,
    instituting a non-Sabbath mode for the refrigerator appliance automatically upon reaching the determined Sabbath end time,
    wherein the set compressor interval encompasses a first predetermined period of time in which the compressor is active and a second predetermined period of time in which the compressor is inactive and power is permitted to the temperature sensor, wherein adjusting comprises altering the first predetermined period of time or the second predetermined period of time according to a predetermined increment of time, and wherein the temperature signal is received from the temperature sensor during the instituted Sabbath mode irrespective of whether the compressor is inactive.

10. The refrigerator appliance of claim 9, wherein receiving a temperature signal repeats at a randomized interval.

11. The refrigerator appliance of claim 9, wherein the temperature sensor is mounted in operable communication with the refrigerated chamber, and wherein the received temperature signal corresponds to a temperature within the refrigerated chamber during the instituted Sabbath mode irrespective of whether the compressor is inactive.

12. The refrigerator appliance of claim 9, wherein the temperature sensor is mounted in operable communication with an ambient environment surrounding the cabinet, and wherein the received temperature signal corresponds to a temperature of the ambient environment during the instituted Sabbath mode irrespective of whether the compressor is inactive.

13. The refrigerator appliance of claim 9, wherein the sealed refrigeration system further comprises an evaporator in fluid communication with the compressor to receive a sealed refrigerant therefrom and a defrost heater in thermal communication with the evaporator, and wherein the operation routine further comprises activating the defrost heater at a set defrost interval during the instituted Sabbath mode.

14. The refrigerator appliance of claim 9, further comprising a user interface panel operatively coupled to the controller, wherein the operation routine further comprises deactivating the user interface panel in response to the instituted Sabbath mode, the user interface panel being maintained in an unresponsive state continuously during the instituted Sabbath mode.

\* \* \* \* \*